(12) United States Patent
Blanchard et al.

(10) Patent No.: US 11,621,906 B2
(45) Date of Patent: Apr. 4, 2023

(54) METHOD FOR TEST TRAFFIC GENERATION AND INSPECTION, AND ASSOCIATED SWITCH INPUT OR OUTPUT PORT AND SWITCH

(71) Applicant: BULL SAS, Les Clayes sous Bois (FR)

(72) Inventors: Vivian Blanchard, Saint Germain (FR); Laurent Marliac, Saint Laurent du Var (FR); Dominique Rigal, Nice (FR); Pierre Axel Lagadec, Villeneuve-Loubet (FR)

(73) Assignee: BULL SAS, Les Clayes Sous Bois (FR)

( * ) Notice: Subject to any disclaimer, the term of this patent is extended or adjusted under 35 U.S.C. 154(b) by 574 days.

(21) Appl. No.: 15/952,785

(22) Filed: Apr. 13, 2018

(65) Prior Publication Data

US 2018/0302313 A1   Oct. 18, 2018

(30) Foreign Application Priority Data

Apr. 13, 2017   (FR) ...................................... 17 53247

(51) Int. Cl.
*H04L 43/50* (2022.01)
*H04L 43/04* (2022.01)
(Continued)

(52) U.S. Cl.
CPC .......... *H04L 43/50* (2013.01); *H04L 41/0879* (2013.01); *H04L 43/028* (2013.01);
(Continued)

(58) Field of Classification Search
CPC ....... H04L 43/50; H04L 43/028; H04L 43/04; H04L 43/0847; H04L 41/8079; H04L 49/101; H04L 49/254; H04L 49/55
See application file for complete search history.

(56) References Cited

U.S. PATENT DOCUMENTS 8,149,730 B1 *   4/2012   Aybay ..................... H04L 43/10
                                            370/389
8,630,187 B1 *   1/2014   Rodberg ................. H04L 49/10
                                            714/36
(Continued)

FOREIGN PATENT DOCUMENTS

EP       0 518 199 A2      12/1992
EP       0518199 A2 *      12/1992   ......... H04L 49/3009
(Continued)

OTHER PUBLICATIONS

Agrawal Vishwani et al. :Built-in self-test for digital integrated circuits, At&t Technical Journal, American Telephone and Telegraph co. New York, US, vol. 73, No. 2, Mar. 1, 1994 pp. 30-39, XP011628378, ISSN: 8756-2324.
(Continued)

*Primary Examiner* — Shean Tokuta
(74) *Attorney, Agent, or Firm* — Meagher Emanuel Laks Golberg & Liao, LLP (57) ABSTRACT

Disclosed is a method for test traffic generation, at test-sending switches for a network of calculation nodes, and of inspection of this test traffic, at test-receiving switches of this network, including: the generation and sending of test traffic, at least at a selected test-sending input or output port of one selected test-sending switch, sent to at least one selected test-receiving input or output port of a selected test-receiving switch, where the test traffic is generated and sent by a traffic generation component configured as an additional input of the selected test-sending input or output port, where the test traffic is inspected by a traffic inspection component configured for filtering the output of the selected test-receiving input or output port.

27 Claims, 5 Drawing Sheets

(51) Int. Cl.
*H04L 41/08* (2022.01)
*H04L 49/101* (2022.01)
*H04L 49/253* (2022.01)
*H04L 43/028* (2022.01)
*H04L 43/0823* (2022.01)
*H04L 49/55* (2022.01)

(52) U.S. Cl.
CPC .......... *H04L 43/04* (2013.01); *H04L 43/0847* (2013.01); *H04L 49/101* (2013.01); *H04L 49/254* (2013.01); *H04L 49/55* (2013.01)

(56) References Cited

U.S. PATENT DOCUMENTS

| | | | | |
|---|---|---|---|---|
| 8,743,715 | B1* | 6/2014 | Eddy | H04L 43/50 |
| | | | | 370/252 |
| 8,854,984 | B1* | 10/2014 | Li | H04L 43/50 |
| | | | | 370/242 |
| 10,153,962 | B2* | 12/2018 | Marelli | H04L 49/25 |
| 10,587,491 | B1* | 3/2020 | Volpe | H04L 41/0803 |
| 10,659,571 | B1* | 5/2020 | Volpe | H04L 69/22 |
| 10,666,775 | B1* | 5/2020 | Volpe | H04L 43/50 |
| 2008/0298261 | A1* | 12/2008 | Rittmeyer | H04L 43/50 |
| | | | | 370/250 |
| 2012/0236727 | A1* | 9/2012 | Chou | H04L 43/50 |
| | | | | 370/241 |
| 2014/0010094 | A1* | 1/2014 | Robitaille | H04L 43/0858 |
| | | | | 370/252 |
| 2014/0022922 | A1* | 1/2014 | Tokunaga | H04L 43/50 |
| | | | | 370/252 |
| 2014/0119203 | A1* | 5/2014 | Sundaram | H04L 43/50 |
| | | | | 370/250 |
| 2014/0269347 | A1* | 9/2014 | Gintis | H04L 43/50 |
| | | | | 370/244 |
| 2014/0321285 | A1* | 10/2014 | Chew | H04L 43/10 |
| | | | | 370/236 |
| 2015/0103673 | A1* | 4/2015 | Shimada | H04L 43/0811 |
| | | | | 370/241.1 |
| 2017/0366442 | A1* | 12/2017 | Marelli | H04L 49/25 |
| 2017/0373949 | A1* | 12/2017 | Furuichi | H04L 43/045 |
| 2018/0219980 | A1* | 8/2018 | McCulley | H04L 1/0006 |
| 2018/0254969 | A1* | 9/2018 | Joseph | H04L 43/50 |
| 2018/0302313 | A1* | 10/2018 | Blanchard | H04L 43/50 |

FOREIGN PATENT DOCUMENTS

| | | | |
|---|---|---|---|
| EP | 2 299 633 A1 | 3/2011 | |
| EP | 3389224 A1 * | 10/2018 | ......... H04L 41/0879 |

OTHER PUBLICATIONS

FR Search Report, dated Oct. 17, 2017, from corresponding FR 1 753 247 application.

* cited by examiner

METHOD FOR TEST TRAFFIC GENERATION AND INSPECTION, AND ASSOCIATED SWITCH INPUT OR OUTPUT PORT AND SWITCH

FIELD OF THE INVENTION

The invention relates to the field of methods for test traffic generation and inspection, within a network of calculation nodes, so as to detect and localize a cabling or routing failure within this network resulting in a functional failure of this network.

CONTEXT OF THE INVENTION

According to a first prior art, software for test traffic generation and inspection is known that sends one or more messages from a terminal calculation node to another terminal calculation node in the network. This type of method of test traffic generation and inspection on the one hand has a limited overall effectiveness and also can result in a notable level of disruption in the network during this verification process.

According to a second prior art, a very local test method for links from one output port to the input port which is directly connected thereto is known. The second type of test method is both limited to a very specific failure type and also incapable of locating a cabling or routing failure within a network with a relatively global test method along a path in the network which can be fairly long.

BRIEF DESCRIPTION OF THE INVENTION

The object of the present invention is to provide a method of test traffic generation and inspection at least partially remedying one and/or the other of the aforementioned disadvantages.

More specifically, the invention aims to provide a method of test traffic generation at test-sending switches in a network of calculation nodes, and of test traffic inspection at test-receiving switches in this network, where this test traffic is generated at entry to a sending input or output port and is inspected by output filtering of a receiving input or output port.

The implementation, in at least some switches, of a test traffic generation component and, in at least some identical and/or different switches, of a test traffic inspection component, greatly improves the cabling verification process within a calculation node network, where a calculation node is a network terminal essentially dedicated to performing calculations, meaning a calculation processor, for example.

In fact, the invention proposes a method of network cabling verification from a port of one switch to another port of another switch or possibly of the same switch that is essentially based on the addition of components, meaning essentially hardware, in contrast to the method of network cabling verification according to the prior art which is essentially based on the implementation of software for test traffic generation and inspection, meaning essentially software, that verifies the flow of data from one terminal calculation node to another terminal calculation node in the network.

The method of network cabling verification proposed by the invention has several advantages. First, because of this method of network cabling verification, it is easier to precisely localize a problem within the network, instead of, either simply knowing that an end-to-end path between two terminals is defective without knowing precisely where the failure is located, or only verifying a very reduced path end within the network such as verifying the presence or absence of the failure between one output port and the input port with which it is associated. Next, the verification can already be finished before the installation of the terminal calculation nodes, just in the presence of the network switches and their interconnections, without any need to wait for the full installation of the network with all the terminal calculation nodes. Finally, according to some preferred embodiments of the invention, this implementation of test traffic generation and inspection components can be done simply, with minimal disturbance of the network core, meaning in particular without modifying the routing tables of various network switches; to do that, it is sufficient to assign the same identifier to each of these test traffic generation or inspection components as the input port or output port to which it is connected and which is already in all the routing tables of the various network switches.

Preferably, in the method of test traffic generation and inspection according to the invention, the same identifier is assigned to each test traffic generation component as the identifier of the test-sending input or output port of the test-sending switch to which this generation component is dedicated, and/or the same identifier is assigned to each test traffic inspection component as the identifier of the test-receiving input or output port of the test-receiving switch to which this inspection component is dedicated.

In summary, the implementation of hardware components at network switches instead of the addition of additional software going from one network terminal to another has several advantages, among them: both a more precise localization of the failure detected in the network and also a possibility of verification without installation of terminals, and everything advantageously with a reduced or even minimized disruption of network operation, in particular preferably without modification of the routing tables in the network switches.

According to preferred embodiments of the invention, in the network, the integrity of all paths can be tested, and also the behavior and performance thereof; the network topology and the reliability thereof can be tested by generating test traffic; most of the test traffic characteristics are configurable; and, so long as the density of test traffic generation and inspection components is sufficient, all network layers can be tested and verified.

According to preferred embodiments of the invention, a network comprising at least several thousand, or even at least several tens of thousands, of calculation nodes, for example 64,000 calculation nodes, can be effectively tested.

For this purpose, the present invention proposes a method for test traffic generation, at test-sending switches for a network of calculation nodes, and of inspection of this test traffic, at test-receiving switches of this network, comprising: the possibility of generating and sending test traffic, at each test-sending input or output port of each test-sending switch, sent to any test-receiving input or output port of any test-receiving switch; the selection of at least one test-sending input or output port of a test-sending switch and at least one test-receiving input or output port of a test-receiving switch; and the generation and sending of test traffic, at least at one selected test input or output sending port of a selected test-sending switch, sent to at least one selected test-receiving input or output port of a selected test-receiving switch, where said test traffic is generated and sent by a traffic generation component configured as an additional input of said selected test-sending input or output port, where said test traffic is inspected by a traffic inspection component configured for filtering the output of said selected test-receiving input or output port.

For this purpose, in order to improve the method for verification of the network by improving test traffic generation, the present invention also proposes an input or output port for a calculation node network switch, comprising: one or more functional traffic receiving inputs, one additional test traffic sending input, a test traffic generation component configured at this additional input, a block for arbitration between said inputs, a traffic sending output depending on the arbitration done by the arbitration block.

For this purpose, in order to improve the method for verification of the network by improving test traffic inspection, the present invention also proposes an input or output port for a calculation node network switch, comprising: several functional traffic receiving inputs, a block for arbitration between said inputs, a traffic sending output depending on the arbitration done by the arbitration block, and a traffic inspection component configured for filtering said traffic sending output.

For this purpose, in order to improve the method for verification of the network by simultaneously improving test traffic generation and inspection, the present invention equally proposes an input or output port for a calculation node network switch, comprising: one or more functional traffic receiving inputs, one additional test traffic sending input, a test traffic generation component configured at this additional input, a block for arbitration between said inputs, a traffic sending output depending on the arbitration done by the arbitration block, and a traffic inspection component configured for filtering said traffic sending output.

For this purpose, in order to improve the method for verification of the network by improving test traffic generation and/or inspection, and to do this at an initially sufficient and subsequently increasing number of input or output ports of an initially sufficient and subsequently increasing number of switches in the network, for improving the network coverage in terms of detection of cabling failure within the network, the present invention again proposes a switch comprising several input ports and several output ports characterized in that at least one or more of the input ports thereof or at least one or more of the output ports thereof, preferably the majority of the input ports thereof or the majority of the output ports thereof, even more preferably all of the input ports thereof or all of the output ports thereof, are input or output ports according to the invention.

According to preferred embodiments, the invention comprises one or more of the following characteristics which can be used separately or in partial combination with each other or in full combination with each other, with one or another of the aforementioned objectives of the invention.

Preferably, each test-sending input or output port of each test-sending switch comprises a test traffic generation component dedicated thereto. Thus, the implementation is even more fully hardware, there isn't even a need to provide software layers so that several input and/or output ports can as needed exchange and share one test traffic generation component.

Preferably, each test-receiving input or output port of each test-receiving switch comprises a test traffic inspection component dedicated thereto. Thus, the implementation is even more fully hardware, there isn't even a need to provide software layers so that several input and/or output ports can as needed exchange and share one test traffic inspection component.

Preferably, the generation of test traffic, at the at least one test-sending switch, and the inspection of this test traffic, at the at least one receiving switch, are done in addition to the functional traffic of this calculation-node network. Thus, there is the possibility of performing the test, even during operation of the network, which makes this test "real time", and even without interrupting the operation, which makes this test "unintrusive". Additionally, in this way specific conditions can be created, for example overloading one or more routes and/or one or more virtual channels for verifying the proper reaction of the network, which makes this test "able to test the network under extreme conditions".

Preferably, the method of test traffic generation and inspection comprises at least one test switch which is both a test-sending switch and a test-receiving switch, and which comprises: at least one test input or output port which is both a test-sending input or output port and a test-receiving input or output port, preferably several, even more preferably a majority, and advantageously all, of the test input or output ports thereof which are both a test input or output port and a test-receiving input or output port, and preferably several, even more preferably majority, and advantageously all of the test switches thereof which are both test-sending switch and test-receiving switch. In that way, the coverage for detection of a failure within the network and the precision of the localization of this failure once it is detected are notably improved.

Preferably, each test input or output port, which is both a test-sending input or output port and a test-receiving input or output port, comprises both a traffic generation component and a traffic inspection component. In that way, the coverage for detection of a failure within the network and the precision of the localization of this failure once it is detected are notably improved.

Preferably, for one or more test-sending and/or test-receiving switches, preferably for the majority of test-sending and/or test-receiving switches, still more preferably for all test-sending and/or test-receiving switches: either the majority of input ports, or the majority of output ports are test-sending and/or test-receiving input or output ports, preferably, either all input ports, or all output ports are test-sending and/or test-receiving input or output ports. In that way, the coverage for detection of a failure within the network and the precision of the localization of this failure once it is detected are notably improved.

Preferably the majority, preferably all, calculation node network switches are test-sending and/or test-receiving switches. In that way, the coverage for detection of a failure within the network and the precision of the localization of this failure once it is detected are notably improved.

Preferably, for one or more test-sending and/or test-receiving switches, preferably for the majority of test-sending and/or test-receiving switches, still more preferably for all test-sending and/or test-receiving switches: the majority, preferably all, test-sending and/or test-receiving input or output ports are output ports. In that way, the use of an output port instead of an input port for locating test traffic generation and/or inspection components makes the hardware implementation of these components structurally simpler. In fact, these components can for example be added in the form of a single additional input on a multiplexer (or other arbitration mechanism) instead of requiring the addition of a multiplexer (or other arbitration mechanism) or at least of a multiplexing (or arbitration) level there where one had not been intended for sending just functional traffic.

Preferably, the selection, on the one hand of first the test-sending switch and then the test-sending input or output port thereof, and on the other hand of first the test-receiving switch and then the test-receiving input or output port thereof, is done depending on the network path which is going to have to be tested. In that way, the path or the route to be tested between two specific switch ports can be chosen during this selection step. Provided that the density of traffic generation and inspection components is sufficiently large, a large number of routes or paths through the network can be tested and each path to be tested can be selected by the user of the method of test traffic generation and inspection.

Preferably, the selection selects both a single test-sending input or output port from a single test-sending switch and also a single test-receiving input or output port of a single test-receiving switch. In that way, a first scenario can be tested corresponding to sending test traffic from a single area of the network towards a single area of the network. This first scenario is simple and localizes a failure very precisely. A large number of these first scenarios have to be done to get a good coverage of the network.

Preferably, the selection selects both a single test-sending input or output port from a single test-sending switch and also one or more test-receiving input or output ports of one or more test-receiving switches. In that way, a second scenario can be tested corresponding to sending test traffic from a single area of the network towards several different areas of the network. This second scenario is less simple but also localizes a failure very precisely. A smaller number of these second scenarios have to be done to get a good coverage of the network.

Preferably, the traffic inspection component inspects, at least, whether the address of the test-receiving input or output port of the test-receiving switch reached by the one or more messages from a single test traffic is good: the order of arrival of the messages from a single test traffic, the order of arrival of the parts of a single message sent successively during the generation and sending of a single test traffic. The number of parts (flits or base blocks) of a message on receiving is identical to the number of parts of this message at sending. In that way, the data integrity is fully inspected. Both the order of messages in a single test traffic and also the order and number of message blocks in a single message of a single test traffic are inspected. If a network failure tends to invert the order of messages in a communication or the order of packets in a message, during functional traffic, this could be detected in that way.

Preferably, the selection selects both one or more test-sending input or output ports from one or more test-sending switches and also a single test-receiving input or output port of a single test-receiving switch. In that way, a third scenario can be tested corresponding to sending test traffic from several different areas of the network towards a single area of the network. This third scenario is less simple and localizes a failure a little less precisely. A smaller number of these third scenarios have to be done to get a good coverage of the network.

Preferably, the selection selects both one or more test-sending input or output ports from one or more test-sending switches and also one or more test-receiving input or output ports of one or more test-receiving switch. In that way, a fourth scenario can be tested corresponding to sending test traffic from several different areas of the network towards several different areas of the network. This fourth scenario is more complex and localizes a failure a little less precisely. Performing a very limited number of these fourth scenarios can however be sufficient to get a good coverage of the network.

Preferably, the traffic inspection component: first verifies whether the address of the test-receiving input or output port of the test-receiving switch reached by a test traffic message is good, next, if this address is good, it inspects the integrity of the data from this test traffic message. In that way, the data integrity is fully inspected. First, the receiving address is verified. If this address is not correct, there is a failure without any need for further verification. If this address is correct, then other more sophisticated verifications are done, such as, for example, the integrity of the data contained in the message that arrived at a good destination.

Preferably, at least part of the test traffic, preferably all test traffic, which is generated and sent at a selected test-sending output port of a selected test-sending switch first loops back by an input port of this selected test-sending switch before leaving this selected test-sending switch for next going towards the selected test-receiving input or output port of the selected test-receiving switch, either directly or indirectly through one or more other network switches. Thus, even before verifying the presence or absence of failure on the path between two switches, sending and receiving respectively, the presence or absence of failure at the sending switch is verified.

Preferably, the generated test traffic comprises one or more messages, where the message or each message comprises a test traffic indicator specifying whether it is part of test traffic or functional traffic, the message, or the last message comprising a test traffic end indication specifying the end of the current test traffic, where this test traffic end indication triggers re-initialization of the state of the one or more traffic inspection components of the one or more receiving input or output ports of the current test. The messages from a test traffic are marked. First, each message of test traffic is marked so as to indicate the end of this test traffic message. Next, the last message of test traffic is marked so as to indicate the end of all of this test traffic. In this way, the test traffic inspection component knows how things stand, meaning at what phase of the test traffic it is situated, in particular in order to be able to reinitialize at the end of test traffic, which saves in particular on having to send a specific reinitialization message at the end of test traffic.

Preferably, the various successive messages from a single test traffic, routed on a single physical channel, all follow a single virtual channel associated with those physical channel. As a first option, the virtual channel of a physical channel is chosen in a fixed manner; it is always the same virtual channel which is chosen. The test is thus simple and controlled. The test is however less rich, because it does not explore potential failures of other virtual channels associated with this physical channel.

Preferably, the various successive messages from single test traffic, routed on a single physical channel, follow different virtual channels associated with this physical channel, where the virtual channel of each new message is chosen randomly. In a second option, the virtual channel of a physical channel is chosen randomly; the same virtual channel is never (or almost never) chosen, and it is not known what channel is going to be chosen next. The test is thus complete. The test is however a little more complex and a little less well controlled, because it is not known how the following virtual channel(s) is going to be chosen.

Preferably, the various successive messages from a single test traffic, routed on a single physical channel, follow different virtual channels associated with this physical channel, where the virtual channel of each new message is incremented each time. In a third option, the virtual channel of a physical channel is chosen incrementally; the same virtual channel is never (or almost never) chosen, but the virtual channel that is going to be chosen next can be predicted. The test is thus controlled and complete. The test is however a little more complex to manage.

Preferably, the proportion of bandwidth available for test traffic generation and sending at the origin is configurable by the user of the method of generation and inspection, preferably from 0% to 100%; the priority level of test traffic relative to all or part of the functional traffic is configurable by the user of the method of generation and inspection, from the highest priority down to the lowest priority and going through one or more intermediate priorities. Thus, the impact of the test traffic, in particular on ongoing functional traffic, can be better controlled. First, the level of required resources can be configured, by means of a configuration of the usable bandwidth. Second, the criticalness of the use of required resources can also be configured, by means of a configuration of the priority level of the test traffic relative to the functional traffic, so as to make the test traffic less intrusive and to confirm that the test traffic does not risk degrading or disrupting too much the functional traffic, or even simply that the test traffic does not block the functional traffic and crash the network during a large and long calculation task which would have to be restarted in whole or in part, leading to a heavy loss of efficiency for the whole network. Alternatively, all functional traffic can be left with priority and only let lower priority test traffic pass in the portion of bandwidth left free by the priority functional traffic, then filling with the lower priority test traffic either all or part of this bandwidth left free by the priority functional traffic.

Preferably, the test traffic inspection component comprises a status register which stores for the test traffic that it inspects, as called for: a receiving error, the number of the first erroneous message, the number of the first part of an erroneous message, the sending address, this status register indicating whether test traffic is in progress or not. The status register is representative of the test results. Consulting it is therefore sufficient for determining the presence or absence of a failure, for being able to localize it precisely, and to have additional information on the nature of this failure.

Preferably, the input or output port of a calculation node network switch according to the invention comprises: a network identifier, a test traffic-generation component to which is assigned the same identifier, and/or a test traffic inspection component to which is assigned the same identifier. Thus, the test traffic generation and/or inspection components can be implemented largely in the network, at most or even all network switches, with a minimized disruption of the network, and in particular without modifying the content of the routing tables located at the network switches.

Preferably the input or output port of the calculation node network switch according to the invention is an outlet port. In that way, the use of an output port instead of an input port for locating test traffic generation and/or inspection components makes the hardware implementation of these components structurally simpler. In fact, these components can for example be added in the form of a single additional input on a multiplexer instead of requiring the addition of a multiplexer or at least of a multiplexing level there where one had not been intended for sending just functional traffic.

Preferably, the block for arbitration between said inputs is a multiplexer and the traffic inspection component is located right at the output of this multiplexer. Thus, the implementation of the output inspection component right at the output of the multiplexer makes the inspection operation simpler and easier, because the packets or packet blocks to be inspected are "raw", and not "encapsulated" in specific formats with which they can be incorporated into the structure of the messages, whether it is messages which were just received or those which were just sent.

Preferably, the switch comprises: a switching matrix connecting at least several tens of input ports to several tens of output ports, upstream from each input port is located successively at least one pair of input cables, a serial-to-parallel converter, a receiving protocol block de-encapsulating the message packets into base blocks, and downstream of each output port is found successively a transmission protocol block encapsulating the base blocks and message packets, a parallel-to-serial converter, and at least one pair of output cables. Thus, the method of test traffic generation and inspection can be implemented simply and effectively, even between two switches having a sophisticated structure.

Other features and advantages of the invention will appear to the reader of the following description of a preferred embodiment of the invention, given as an example and with reference to the attached drawings.

DETAILED DESCRIPTION OF THE INVENTION

Figure 1:
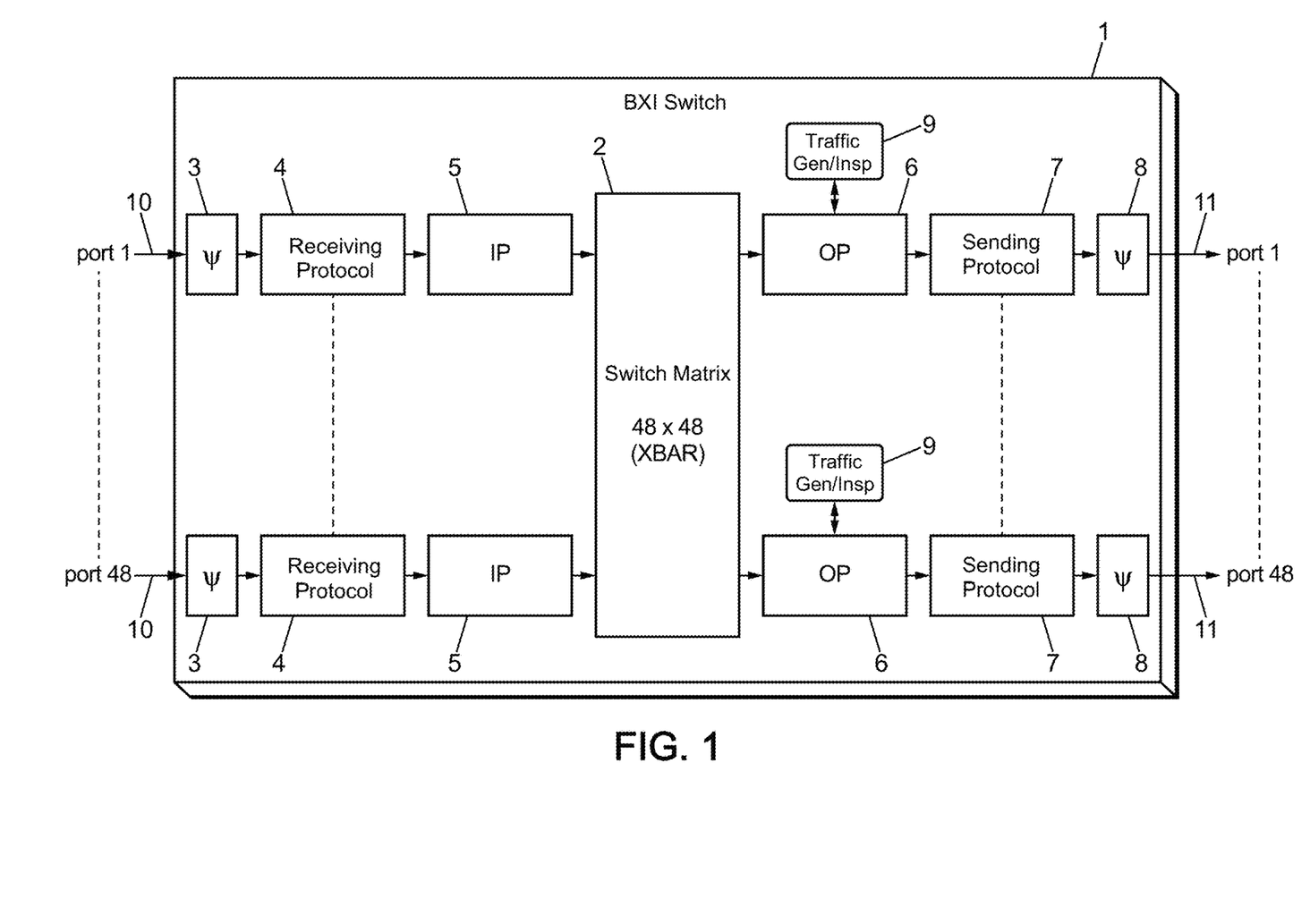
FIG. 1 schematically shows a sample switch comprising several output ports implementing a test traffic generation component and a test traffic inspection component according to an embodiment of the invention.

FIG. 1 schematically shows a sample switch comprising several output ports implementing a test traffic generation component and a test traffic inspection component according to an embodiment of the invention.

The switch 1 comprises a switch matrix 2 connecting 48 input ports 5 with 48 output ports 6. Upstream of each input port 5 are located successively, in upstream to downstream direction, one or two pairs of input cables 10 on which the electrical signals arrive, a serial-to-parallel converter 3 (or serial-to-parallel block 3), putting in parallel the signals received in series, a receiving protocol block 4 de-encapsulating the message packets into base blocks. Downstream from each output port 6 there are successively, in the upstream to downstream direction, a transmission protocol block 7 encapsulating the base blocks in message packets, a parallel-to-serial converter 8 (or parallel-to-serial block 8), putting in series signals received in parallel, one or two pairs of output cables 11 on which electrical signals are sent. In each output port 6, a mechanism for test traffic generation and inspection 9 is added which can both generate and add test traffic to the functional traffic and also extract, out from functional traffic with which it is mixed, the test traffic to be inspected.

Figure 2:
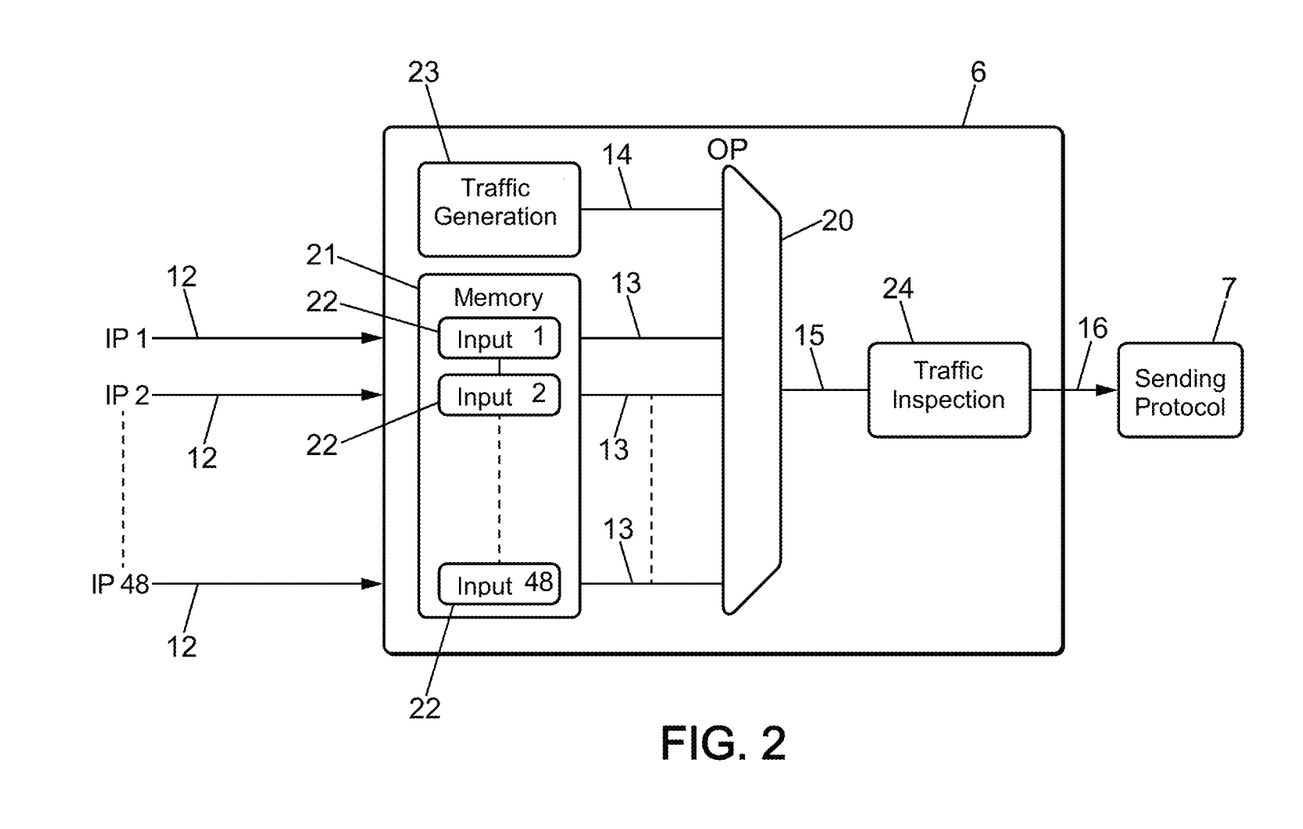
FIG. 2 schematically shows a sample output port implementing a test traffic generation component and a test traffic inspection component according to an embodiment of the invention.

FIG. 2 schematically shows a sample output port implementing a test traffic generation component and a test traffic inspection component according to an embodiment of the invention.

The output port 6 multiplexes the inputs 12 coming respectively from 48 input ports 5 after having passed through the switch matrix 2 onto an output 16 going to the transmission protocol block 7 encapsulating the base blocks in message packets. The output port 6 comprises a multiplexer 20. The message blocks coming from the inputs 12 are respectively stored in queues 22 of a memory 21, with one queue 22 per input 12, before being sent respectively into the inputs 13 of the multiplexer 20 which selects and orders the message blocks one after the other for sending them on the output 15 thereof. A test traffic generation component 23 generates test traffic in addition to the functional traffic coming from the inputs 12 originating respectively on the 48 input ports 5. After being generated, this test traffic is sent on a $49^{th}$ additional input 14 of the multiplexer 20 and processed depending on the priority thereof relative to the priority of the other inputs 13 and also depending on the load, meaning the proportion of available bandwidth used. The test traffic generation component 23 is configured as an additional input of the multiplexer 20 and therefore as an additional input to output port 6. A test traffic inspection component 24 is located on the output of the multiplexer 20; the test traffic inspection component 24 extracts and inspects the test traffic which is on the output 15 of the multiplexer 20 and which was intended for the output port 6 in which it is located. The functional traffic, like the test traffic which is not intended for output port 6, passes directly through the test traffic inspection component 24 to arrive on the output 16 of the output port 6.

The main function of the test traffic generation component 23 is to generate test traffic, alone or mixed with functional traffic. All the parameters of the test traffic generated are advantageously adjustable by configuration registers. There is one test traffic generation component 23 per output port 6, where the test traffic generation component 23 is considered as an additional input port by the output port 6 arbitration mechanism 20 which is advantageously a multiplexer 20. The test traffic generation component 23 generates a series of messages composed of message blocks, meaning "flits", with a 32-byte size, for example. The length of the messages can be either random or defined by a configuration register.

For each message sent by the test traffic generation component 23 on a physical channel, the virtual channel can be selected in different ways. The virtual channel can be fixed; this means that the same virtual channel is always used. The virtual channel can be random; this means that for each new message the virtual channel is chosen at random. The virtual channel can be incremental; this means that each time a new message is sent the virtual channel number is incremented such that all virtual channels of a single physical channel are used successively one after the other.

The number of messages sent can be either fixed—this means that the maximum number of messages to be sent is defined by configuration registers—or can be random—this means that it is chosen at random and can vary from a given test traffic to the following tests traffic. The bandwidth used can be programed from 0% to 100%; this means that the test traffic generation component 23 can generate and send over a proportion of bandwidth ranging from 0% to 100% with it understood that the priority level thereof will or won't allow it to go before some other functional traffic message arriving simultaneously at an input of the multiplexer 20.

The main function of the test traffic inspection component 24 is to verify and filter the test traffic when the desired destination of the message is reached and in contrast to allow it to pass like functional traffic when the desired destination is not yet reached. A test traffic inspection component 24 is implemented in each output port 6.

In a first situation, the test traffic is generated from a single area of the network towards another single area of the network. As with functional messages, the integrity of the data is verified all along the path of the messages, which allows raising a local error in case of a reliability problem with a link or memory, for example. The test traffic inspection component 24 verifies the destination correspondence by verifying whether the test traffic destination identifier corresponds to the output port identifier with which it is associated. If that is the case, it means that the generated traffic has reached the intended destination and the traffic will next be verified and filtered. If the destination identifier transported in the generated traffic does not correspond to the output port identifier to which the test traffic inspection component 24 is attached, the traffic will not be verified nor will it be filtered by the test traffic inspection component 24. The tests traffic inspection component 24 verifies that the "flits" or message base blocks do arrive in their sending order. The test traffic inspection component 24 also verifies that the messages arrive in their order of sending.

In a second situation, the test traffic is generated at several different areas in the network to another single other area of the network. In this case, the test traffic is intercepted, but without other verifications than the integrity of the data and the destination correspondence.

First, concerning data integrity verification, as with functional messages, the integrity of the data is verified all along the path of the messages, which allows raising a local error in case of a reliability problem with a link or memory, for example.

Next, involving the destination correspondence, the test traffic inspection component 24 verifies whether the destination identifier corresponds to the output port identifier with which it is associated. If that is the case, it means that the generated traffic has reached the intended destination and the traffic will next be verified and filtered by this test traffic inspection component 24. If the destination identifier transported in the generated traffic does not correspond to the output port identifier to which the test traffic inspection component 24 is attached, the test traffic will not be verified nor will it be filtered by the test traffic inspection component 24, which will let it pass. The essential difference between this second situation and the first situation described previously is that the test traffic inspection component 24 does not verify the relative order of arrival of message base blocks nor the relative order of arrival of received messages. A possible relative shuffling of two message blocks or even of two messages will not be detected here.

In summary, if the test traffic indicator is 1, meaning if it corresponds to test traffic, in contrast to functional traffic whose test traffic indicator is 0, and if the destination identifier corresponds to the identifier of the output port with which the test traffic inspection component 24 is associated, then the message base block is verified and filtered by the test traffic controller component 24. This verification operation is done independently for each virtual channel associated with a single physical channel.

The status register of the test traffic inspection component 24 contains useful information for evaluating the reliability of interconnections between network switches, among them:
- An indicator with which to know whether a generated test traffic is in progress or not;
- For the received test traffic:
  - A 16-bit identifier of the sending source of this test traffic containing the source identifier field contained in the last received message base block;
  - A 16-bit identifier of the destination of this test traffic containing the destination identifier field contained in the last intercepted message base block;
  - A 27-bit per virtual channel message block counter containing the number of the last message base block received; if an error is detected, it contains the number of the first erroneous message base block;
  - A 32-bit message counter containing the number of the last message received; if an error is detected, this register contains the number of the first erroneous message;
  - Any receiving error.

Figure 3:
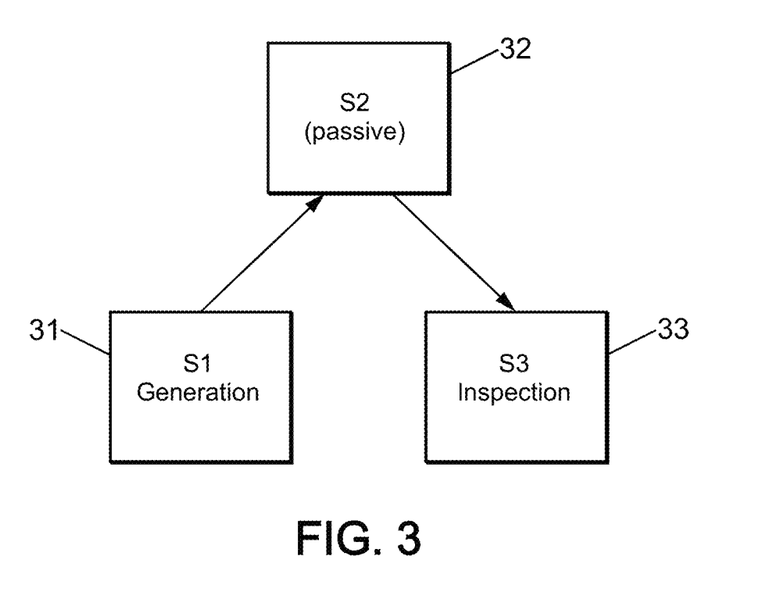
FIG. 3 schematically shows an overall example of test traffic flow from a sending switch to a receiving switch passing through an intermediate switch according to an embodiment of the invention.

FIG. 3 schematically shows an overall example of test traffic flow from a sending switch to a receiving switch passing through an intermediate switch according to an embodiment of the invention. The network is for example a fat-tree topology network.

Test traffic is generated at a first test-sending switch 31, intended for a third test-receiving switch 33 and passing by a second intermediate switch 32. The direction of test traffic flow is shown by the direction of the double arrows. At each network switch, 31, 32 or 33, here at the test traffic sending switch 31, it must be possible to generate test traffic independently of functional traffic and in addition to functional traffic. At each network switch, 31, 32, 33, here at the test traffic receiving switch, it must be possible to inspect the test traffic by extracting it from the functional traffic.

This test traffic can be generated alone, or mixed with functional traffic, and in the latter case this test traffic is considered as an additional test input compared to the other functional inputs, meaning those providing functional traffic. There are several conceivable scenarios. In one scenario, test traffic can be generated and inspected internally in the same switch using an internal loopback, for example of test traffic generated in switch 31 and which would be intended for the same switch 31. In another scenario, test traffic can be generated at one sending switch, like the switch 31, and then sent through several switches, like the intermediate switch 32, for reaching the end destination which would be the receiving switch 33.

Figure 4:
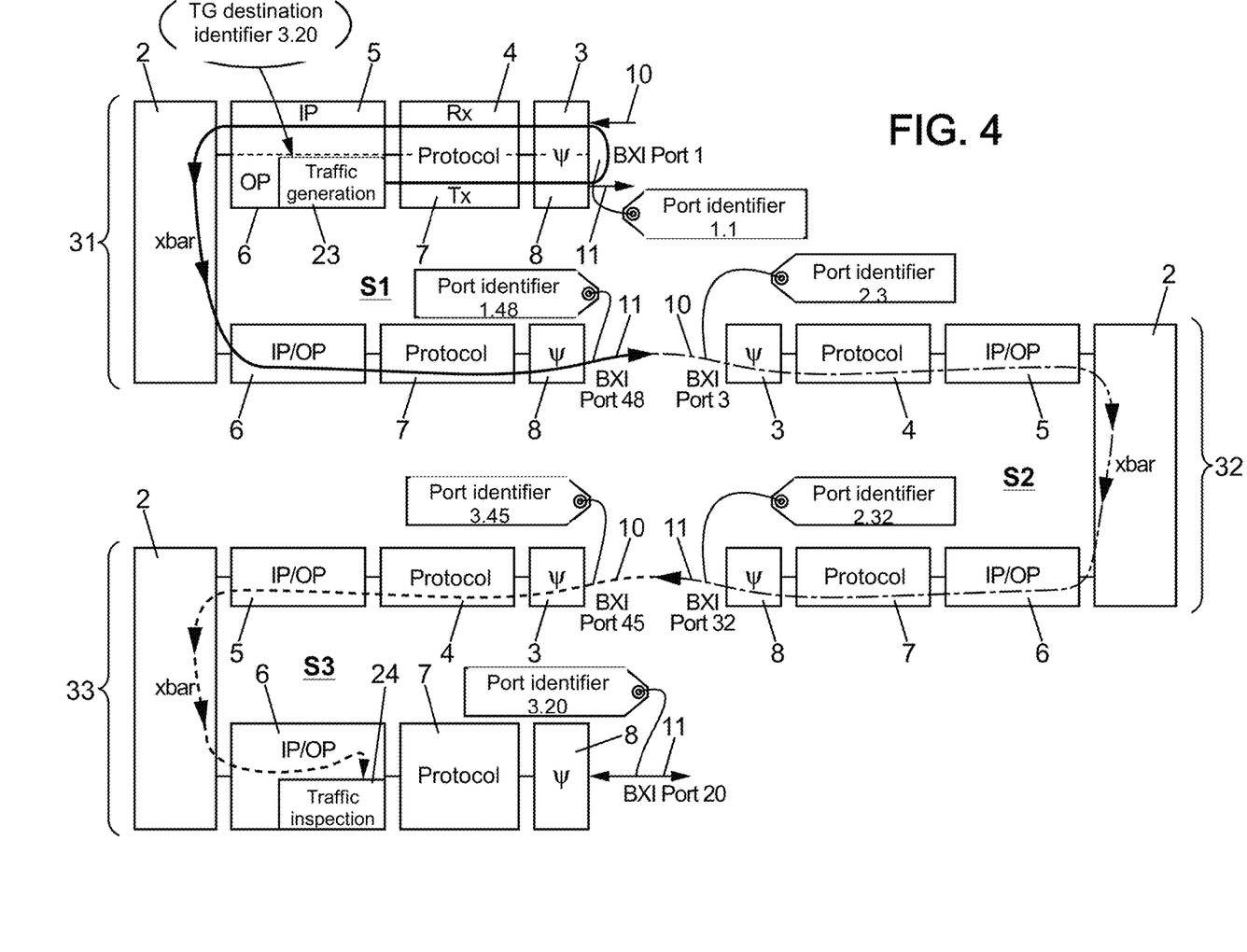
FIG. 4 schematically shows a detailed example of test traffic flow from a sending switch to a receiving switch passing through an intermediate switch according to an embodiment of the invention.

FIG. 4 schematically shows a detailed example of test traffic flow from a sending switch to a receiving switch passing through an intermediate switch according to an embodiment of the invention.

The routing tables in the input ports 5 of switches 31 to 33 used to route messages in the switches are updated by software. All useful entries in the routing tables will be configured. Each input port 5 must have a unique identifier which first serves to trace the sending port, then trace the receiving port, and finally find the traffic destination by matching the entry from the routing table to the identification of the destination port. All configuration registers are updated by software depending on the topology of the network. The generated test traffic is filtered in the destination port 6 by the test traffic inspection component 24.

There are several conceivable scenarios. A first scenario, called "1-to-1", calls for each destination to receive traffic from just one source and vice versa. The content of the packet headers is sufficient for performing auto verification of received messages. A second scenario, called "N-to-1", provides that 1-to 1 traffic is generated sequentially from N different sources towards the same destination. A third scenario, called "1-to-N", calls for 1-to-1 traffic to be generated sequentially from the same source to N different destinations. The fourth scenario, call "N-to-N" provides mixing the traffic from the second and third scenarios previously described.

Each input port 5 at each output port 6 of each switch 31 to 33 has its own identifier, which associates a switch number with a port number. Each of these ports 5 or 6 will be accessible by a dedicated destination identifier. The routing table for each input port 5 is configured depending on the network topology. All test traffic inspection components 24, on the path of the current traffic, verify whether the destination identifier sent in the message is identical with the port identifier with which they are associated. If that is the case, it means that the message has reached the final destination and it will be filtered. If that is not the case, the message is simply transferred.

A precise example of a path of a message from a test traffic starting from sending switch 31 passing through intermediate switch 32 and arriving at receiving switch 33 is now going to be described in connection with FIG. 4. An identifier 1.N corresponds to the port N of the sending switch 31. An identifier 2.N corresponds to the port N of the intermediate switch 32. An identifier 3.N corresponds to the port N of the receiving switch 33.

The traffic is generated from the output port 6 with number 1 of sending switch 31.

The output port 6 with number 1 in the sending switch 31 is looped back on itself, the traffic therefore comes back on input port 5 with number 1 in the sending switch 31.

The routing table for input port 5 with number 1 in the sending switch 31 is read with the entry 3.20 which corresponds to the final destination of messages generated in this test traffic. The destination read in the routing table is the output port 6 with number 48 in the sending switch 31.

In the output port 6 with number 48 in the sending switch 31, the test traffic inspection component 24 (not shown on FIG. 4) verifies that the destination identifier and the identifier of the output port 6 with number 48 in the sending switch 31 are not equal; these identifiers are respectively 3.20 and 1.48.

The test traffic leaves output port 6 with number 48 in the sending switch 31 and passes to input port 5 with number 3 in intermediate switch 32 by simply following the cabling connecting them.

The routing table for input port 5 with number 3 in the intermediate switch 32 is read with the entry 3.20 which corresponds to the final destination of messages generated in this test traffic. The destination read in the routing table is the output port 6 with number 32 in the intermediate switch 32.

In the output port 6 with number 32 in the intermediate switch 32, the test traffic inspection component 24 (not shown on FIG. 4) verifies that the destination identifier and the port identifier are not equal; these identifiers are respectively 3.20 and 2.32.

The traffic leaves output port 6 with number 32 in the intermediate switch 32 and passes to input port 5 with number 45 in receiving switch 33.

The routing table for input port 5 with number 45 in the receiving switch 33 is read with the entry 3.20 which corresponds to the final destination of messages generated in this test traffic. The destination read in the routing table is the output port 6 with number 20 in the receiving switch 33.

In the output port 6 with number 20 in the receiving switch 33, the test traffic inspection component 24 (shown on FIG. 4) verifies that the destination identifier and the port identifier are equal; here they are one and the same identifier, 3.20. The test traffic has reached the destination and it is then extracted by the test traffic inspection component 24 and it is inspected.

Figure 5:
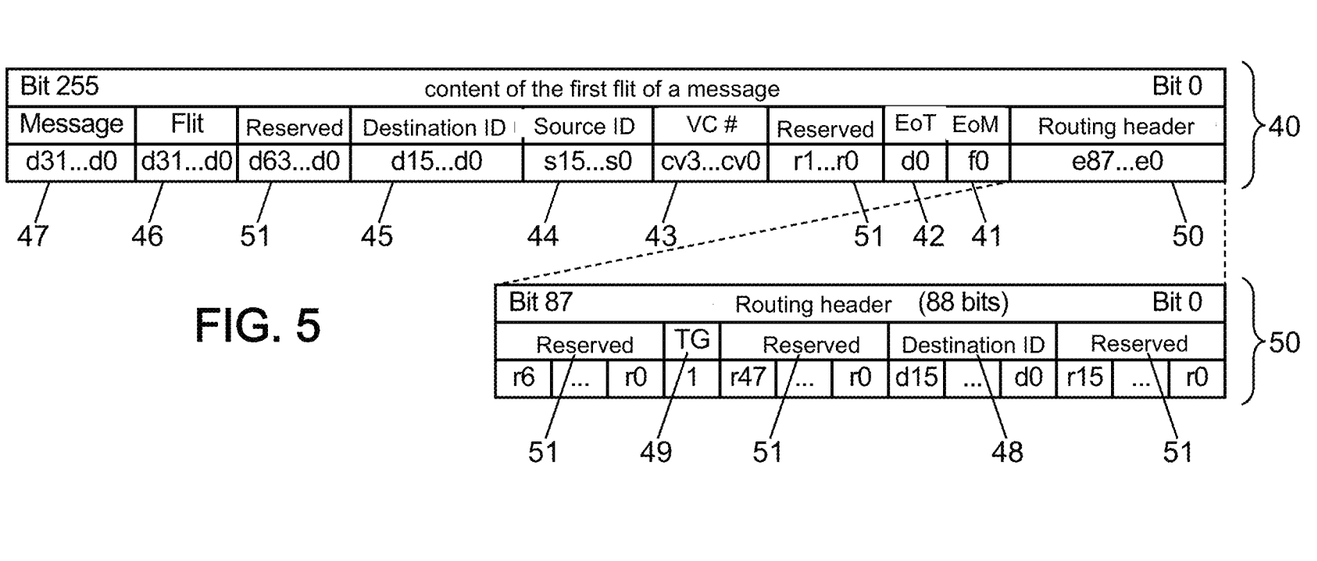
FIG. 5 schematically shows an example of the structure of a first message base block for a test traffic message according to an embodiment of the invention.

FIG. 5 schematically shows an example of the structure of a first message base block for a test traffic message according to an embodiment of the invention.

The base block of the message, also called "flit", is the base unit of a message; the size thereof is 256 bits. Various reserved areas 51 correspond to zones which can be filled with random bits, because they are not used in test traffic management; these areas therefore don't have much interest for test traffic.

For all messages, whether they are functional messages or else generated test messages, the information needed for routing is contained in the routing header 50 of the first base block 40. This routing header 50 is only present in the first base block 40 of each message and not in the following base blocks of this message.

The routing header 50 includes a 16-bit destination identifier 48 which corresponds to the address of the final destination.

In the case of generated traffic, the final destination is a test traffic inspection component.

The destination is a network interface controller ("NIC"), also called calculation terminal, in the case of functional traffic.

The routing header 50 comprises a 1-bit generated test traffic indicator 49, where TG=1 if the message corresponds to generated test traffic and where TG=0 if the message corresponds to functional traffic.

Figure 6:
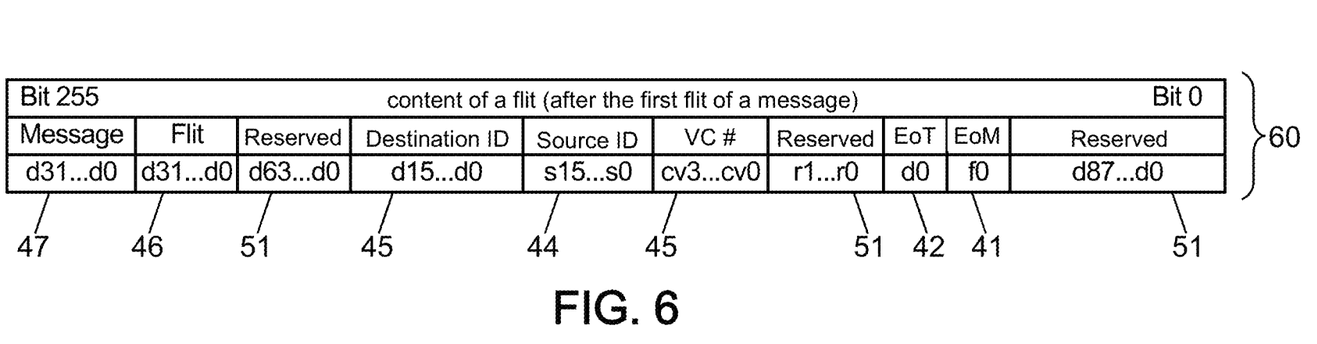
FIG. 6 schematically shows an example of the structure of a message base block following a test traffic message according to an embodiment of the invention.

All base blocks of the generated test traffic message contain information necessary to the test traffic inspection component, such as for example:

A 1-bit end of message indicator 41, indicating when its value is 1 that the corresponding base block is the last block of this message; this end of message indicator 41 is used for incrementing the message counter of the test traffic inspection component;

A 1-bit end of test traffic indicator 42 indicating the end of test traffic when its value is 1; an end of test traffic message is sent on all virtual channels when the test traffic generation component has finished its broadcast;

A 4-bit virtual channel number 43 indicating the virtual channel on which the message was sent;

A 16-bit source identifier 44 indicating the address of the traffic generation component having sent the message;

A 16-bit destination identifier 45 indicating the address of the test traffic inspection component to whom the message is sent;

A 32-bit message base block number 46 indicating the number of the received message base block, with which to thus verify that the base blocks from a single message arrive in the right order, meaning in the order they were sent;

A 32-bit message number 47 indicating the number of the received message with which to thus verify that the messages flowing on a single virtual channel in a single test traffic arrived in the right order, meaning in the order they were sent;

FIG. 6 schematically shows an example of the structure of a message base block following a test traffic message according to an embodiment of the invention.

The message base block 60 is identical to the message base block 40 shown in FIG. 5 except for one difference: the header 50 of the message base block 40 was replaced by a reserved area 51 which can be filled with random bits, because it will not be used by test traffic management.

Of course, the present invention is not limited to the examples and to the embodiment described and shown, but is subject to many variations accessible to the person skilled in the art.

The invention claimed is:

1. A method for test traffic generation, at a test-sending switch (1, 31), the test-sending switch (1, 31) being a switch in a plurality of switches for a network of calculation nodes, and of inspection of said test traffic, at a test-receiving switch (1, 33) of said plurality of switches for said network, each test-sending switch and test-receiving switch in said plurality of switches comprising an input port and an output port, and each test-sending switch and test-receiving switch is capable of sending test traffic from an input port, an output port, or both, to either an input port or an output port of any other switch in said plurality of switches, said other switch in said plurality of switches being capable of receiving and inspecting test traffic at an input port, an output port, or both, the method comprising:

selecting at least one input port or output port of the test-sending switch (1, 31) and at least one input port or output port of the test-receiving switch (1, 33);

generating for the first time said test traffic and sending said test traffic from the selected input port or output port of the test-sending switch (1, 31) to at least one selected input port or output port of the test-receiving switch (1, 33), said test-receiving switch being different from said test-sending switch, said test traffic being generated for the first time and sent by a traffic generation component (23) configured as an additional input (14) of said input port or output port of said test-sending switch (1, 31), and filtering the output (15) of said input port or output port of said test-receiving switch (1, 33) using a traffic inspection component (24), wherein the selection is based on the network path to be tested.

2. The method of test traffic generation and inspection according to claim 1, wherein each input port or output port of each test-sending switch (1, 31) comprises a test traffic generation component (23) dedicated thereto.

3. The method of test traffic generation and inspection according to claim 1, wherein each input port or output port of each test-receiving switch (1, 33) comprises a test traffic inspection component (24) dedicated thereto.

4. The method for test traffic generation and inspection according to claim 1, wherein the generation of test traffic, at the test-sending switch (1, 31), and the inspection of this test traffic, at the test-receiving switch (1, 33), are done in addition to sending and receiving functional traffic of said network of calculation nodes.

5. The method for test traffic generation and inspection according to claim 1, wherein:

Either: a first identifier is assigned to each test traffic generation component (23), the first identifier being the same as an identifier of the input port or output port of the test-sending switch (1, 31) to which this generation component (23) is dedicated, Or: a second identifier is assigned to each test traffic inspection component (24), the second identifier being the same as an identifier of the input port or output port of the test-receiving switch (1, 33) to which this inspection component (24) is dedicated, Or: a first identifier is assigned to each test traffic generation component (23), the first identifier being the same as an identifier of the input port or output port of the test-sending switch (1, 31) to which this generation component (23) is dedicated, and a second identifier is assigned to each test traffic inspection component (24), the second identifier being the same as an identifier of the input port or output port of the test-receiving switch (1, 33) to which this inspection component (24) is dedicated.

6. The method for test traffic generation and inspection according to claim 1, wherein said test-sending switch (1, 31) also inspects said test traffic.

7. The method of test traffic generation and inspection according to claim 6, wherein each input port or output port of each switch in the plurality of switches comprises both a traffic generation component (23) and a traffic inspection component (24).

8. The method for test traffic generation and inspection according to claim 1, wherein:
Either: for said test-sending switch (1, 31), either a majority of said input ports, or a majority of said output ports are used for sending test traffic,
Or: for said test-receiving switch (1, 33), either a majority of said input ports, or a majority of said output ports are used for receiving test traffic,
Or: for said test-sending switch (1, 31) and said test-receiving switch (1, 33), either a majority of said input ports, or a majority of said output ports are used for sending test traffic and receiving test traffic.

9. The method for test traffic generation and inspection according to claim 1, wherein a majority of said plurality of switches for the network of calculation nodes are:
Either: test-sending switches,
Or: test-receiving switches,
Or: test-sending switches and test-receiving switches.

10. The method for test traffic generation and inspection according to claim 1, wherein
Either: for said test-sending switch (1, 31), a majority of said input ports or output ports are output ports,
Or: for said test-receiving switch (1, 33), a majority of said input ports or output ports are output ports,
Or: for said test-sending switch (1, 31) and said test-receiving switch (1, 33), a majority of said input ports or output ports are output ports.

11. The method for test traffic generation and inspection according to claim 1, wherein the selection selects both a single input port or output port from a single test-sending switch (1, 31) and also a single input port or output port of a single test-receiving switch (1, 33).

12. The method for test traffic generation and inspection according to claim 1, wherein the selection selects both a single input port or output port from a single test-sending switch (1, 31) and also:
Either: one or more input ports of one or more test-receiving switches,
Or: one or more output ports of one or more test-receiving switches,
Or: one or more input ports and output ports of one or more test-receiving switches.

13. The method for test traffic generation and inspection according to claim 12, wherein the traffic inspection component (24) inspects the order of arrival of the messages from a single test traffic, and the order of arrival of the parts of a single message sent successively during the generation and sending of the single test traffic.

14. The method for test traffic generation and inspection according to claim 1, wherein the selection selects both:
one or more ports from one or more test-sending switches;
Either: these one or more ports being one or more input ports,
Or: these one or more ports being one or more output ports,
Or: these one or more ports being one or more input ports and one or more output ports,
and
a single input port or output port of a single test-receiving switch (1, 33).

15. The method for test traffic generation and inspection according to claim 1, wherein the selection selects both:
one or more ports from one or more test-sending switches;
Either: these one or more ports being one or more input ports,
Or: these one or more ports being one or more output ports,
Or: these one or more ports being one or more input ports and one or more output ports,
and
one or more ports of one or more test-receiving switches,
Either: these one or more ports being one or more input ports,
Or: these one or more ports being one or more output ports,
Or: these one or more ports being one or more input ports and one or more output ports.

16. The method for test traffic generation and inspection according to claim 13, wherein the traffic inspection component (24):
verifies whether an address of the input port or output port of the test-receiving switch (1, 33) reached by a test traffic message is good; and
if said address is good, inspects the integrity of data from said test traffic message.

17. The method for test traffic generation and inspection according to claim 1, wherein the selected input port or output port is an output port, and at least part of the test traffic which is generated and sent at the selected output port of said test-sending switch (1, 31) first loops back by an input port of said test-sending switch (1, 31) before leaving said test-sending switch (1, 31) and going towards said selected input port or output port of said test-receiving switch (1, 33), either directly or indirectly through one or more other switches in the plurality of switches.

18. The method for test traffic generation and inspection according to claim 1, wherein the generated test traffic comprises one or more messages, where at least one of the one or more messages comprises a test traffic indicator (49) specifying whether it is part of test traffic or functional traffic, a last of the one or more messages comprising a test traffic end indicator (42) specifying the end of the current test traffic, where said test traffic end indicator (42) triggers re-initialization of a state of one or more traffic inspection components (24) of one or more input ports or output ports of one or more test-receiving switches.

19. The method for test traffic generation and inspection according to claim 1, wherein successive messages from a single test traffic, routed on a single physical channel, all follow a single virtual channel associated with said single physical channel.

20. The method for test traffic generation and inspection according to claim 1, wherein a plurality of different virtual channels are associated with a single physical channel, and each successive message from single test traffic routed on said single physical channel follows a randomly chosen virtual channel from among the plurality of different virtual channels.

21. The method for test traffic generation and inspection according to claim 1, wherein a plurality of different virtual channels each assigned a number are associated with a single physical channel, and each successive message from a single test traffic routed on said single physical channel follows a channel from among the plurality of different virtual channels associated with this physical channel, where said virtual channel of each successive message is incremented each time.

22. The method for test traffic generation and inspection according to claim 1, further comprising:
   Either: configuring the proportion of bandwidth available for test traffic generation and sending at the origin,
   Or: configuring the priority level of test traffic relative to all or part of the functional traffic,
   Or: configuring the proportion of bandwidth available for test traffic generation and sending at the origin, and configuring the priority level of test traffic relative to all or part of the functional traffic.

23. The method for test traffic generation and inspection according to claim 1,
   wherein the test traffic inspection component (24) comprises a status register which stores for the test traffic that it inspects, at least one contained in the following list:
      a receiving error,
      the number of the first erroneous message,
      the number of the first part of an erroneous message,
      the sending address,
   and
   wherein said status register indicates whether test traffic is in progress or not.

24. The method for test traffic generation and inspection according to claim 1, wherein said test traffic is:
   generated at one test-sending switch (31);
   sent through one or more intermediate switches (32); and
   received at an end destination which is a receiving switch (33).

25. The method for test traffic generation and inspection according to claim 1, wherein:
   said test traffic generation component (23) is configured as an additional input (14) of a multiplexer (20); and
   said test traffic is sent on said additional input (14) of said multiplexer (20).

26. A method for test traffic generation, at a test-sending switch (1, 31), the test-sending switch (1, 31) being a switch in a plurality of switches for a network of calculation nodes, and of inspection of said test traffic, at a test-receiving switch (1, 33) of said plurality of switches for said network, each test-sending switch and test-receiving switch in said plurality of switches comprising an input port and an output port, and each test-sending switch and test-receiving switch is capable of sending test traffic from an input port, an output port, or both, to either an input port or an output port of any other switch in said plurality of switches, said other switch in said plurality of switches being capable of receiving and inspecting test traffic at an input port, an output port, or both, the method comprising:
   selecting at least one input port or output port of the test-sending switch (1, 31) and at least one input port or output port of the test-receiving switch (1, 33);
   generating for the first time said test traffic and sending said test traffic from the selected input port or output port of the test-sending switch (1, 31) to at least one selected input port or output port of the test-receiving switch (1, 33), said test-receiving switch being different from said Test-sending switch, said test traffic being generated for the first time and sent by a traffic generation component (23) configured as an additional input (14) of said input port or output port of said test-sending switch (1, 31), and
   filtering the output (15) of said input port or output port of said test-receiving switch (1, 33) using a traffic inspection component (24),
   wherein said test traffic is:
   generated at one test-sending switch (31), without being replicated at said one test-sending switch (31), and
   received at an end destination which is a receiving switch (33), without being replicated at said receiving switch (33).

27. A method for test traffic generation, at a test-sending switch (1, 31), the test-sending switch (1, 31) being a switch in a plurality of switches for a network of calculation nodes, and of inspection of said test traffic, at a test-receiving switch (1, 33) of said plurality of switches for said network, each test-sending switch and test-receiving switch in said plurality of switches comprising an input port and an output port, and each test-sending switch and test-receiving switch is capable of sending test traffic from an input port, an output port, or both, to either an input port or an output port of any other switch in said plurality of switches, said other switch in said plurality of switches being capable of receiving and inspecting test traffic at an input port, an output port, or both, the method comprising:
   selecting at least one input port or output port of the test-sending switch (1, 31) and at least one input port or output port of the test-receiving switch (1, 33);
   generating for the first time said test traffic and sending said test traffic from the selected input port or output port of the test-sending switch (1, 31) to at least one selected input port or output port of the test-receiving switch (1, 33), said test-receiving switch being different from said test-sending switch, said test traffic being generated for the first time and sent by a traffic generation component (23) configured as an additional input (14) of said input port or output port of said test-sending switch (1, 31), and
   filtering the output (15) of said input port or output port of said test-receiving switch (1, 33) using a traffic inspection component (24),
   wherein:
   either: for said test-sending switch (1, 31), a majority of said input ports or output ports are output ports,
   Or: for said test-receiving switch (1, 33), a majority of said input ports or output ports are output ports,
   Or: for said test-sending switch (1, 31) and said test-receiving switch (1, 33), a majority of said input ports or output ports are output ports.

* * * * *